2,754,320

PRODUCTION OF DIESTERIFIED PHOSPHONO DERIVATIVES OF MONOFUNCTIONAL COMPOUNDS

Franklin Johnston, St. Albans, W. Va., assignor, by mesne assignments, to Union Carbide and Carbon Corporation, a corporation of New York No Drawing. Application June 24, 1948,
Serial No. 35,056

19 Claims. (Cl. 260—461)

This invention relates to the production of a class of novel diesterified phosphono derivatives of aliphatic and aromatic monocarboxylic esters, amides and nitriles. It has special utility for the production of compounds of the type:

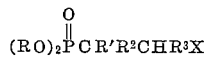
$$(RO)_2 \overset{O}{\overset{\|}{P}} CR'R^2CHR^3X$$

wherein R represents a radical selected from the class consisting of the saturated aliphatic, and alicyclic radicals, the aromatic hydrocarbon radicals, and the alkoxyalkyl, aryloxyalkyl and cycloalkoxyalkyl radicals; R' represents a radical selected from hydrogen and the alkyl, alkenyl and aryl radicals; $R^2$ and $R^3$ respectively represent radicals from the group consisting of hydrogen and the alkyl radicals; X represents a radical selected from the class consisting of $$COOR^4, CONR_2^5$$

and CN, wherein $R^4$ represents a radical selected from the class consisting of the alkyl, cycloalkyl, alkenyl, aralkyl, alkoxyalkyl, aryloxyalkyl, and cycloalkoxyalkyl radicals; and each $R^5$ designates the same or a different radical selected from the class consisting of hydrogen and the alkyl and aryl groups. These new compounds have utility as starting materials for the production of other phosphorus-containing compounds, and for other purposes such as for plasticizing various synthetic thermoplastic resins and cellulosic derivatives.

Preferred compounds having potential utility as flame-retardant plasticizers and modifiers for thermoplastic resin compositions and for resinous cellulosic derivatives are those relatively high boiling compounds of the invention wherein each R of the diesterified phosphono group

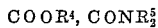
$$(RO)_2 \overset{}{\underset{\overset{\|}{O}}{P}}-$$

represents an alkoxyalkyl group having at least three carbon atoms and one oxy oxygen group, or a hydrocarbon residue having at least four carbon atoms and free from olefinic double bonds.

Compounds of this new type are produced in accordance with the invention by reacting an appropriate phosphite diester with an ester of an α,β-unsaturated monocarboxylic acid, or with the corresponding amide, mono- or di-hydrocarbon substituted amide or nitrile derivative of such acid, preferably at a temperature between 25° C. and 125° C. The reactants are used in the dry state in order to avoid side reactions, but they need not be anhydrous.

While the process is operative in the absence of an added catalyst, in the interest of good yields of the desired products the reaction is conducted in the presence of a small amount, i. e., commonly around 1% to 5%, of a non-acidic condensation catalyst, preferably an alkaline catalyst. Among these may be mentioned the alkali metals such as metallic sodium, potassium and lithium; the alkali metal amides such as sodamide; the alkali metal hydrides such as sodium hydride and potassium hydride; alkali metal alcoholates (alkoxides) such as sodium methylate and potassium ethylate; sodium naphthalene; and the secondary and tertiary amines such as diethylamine and triethylamine. Among the very effective catalysts for this reaction are the salts of phosphite diesters of the type

$$(RO)_2 \overset{O}{\overset{\|}{P}} Y$$

wherein Y represents an alkali metal and R has the meaning hereinbefore indicated. Corresponding salts of the alkaline earth metals and of magnesium are somewhat less effective catalysts.

In one preferred form of the invention, the ester of the α,β-unsaturated monocarboxylic acid, or the corresponding acid amide or nitrile, is added in successive, small increments to an agitated solution of the catalyst in the phosphite diester. Preferably the mixture is cooled where necessary to prevent a temperature rise above about 125° C. However, temperatures as high as 200° C. successfully can be employed. The addition is continued until at least one mol of the ester, or of the amide or nitrile derivative of the unsaturated acid, has been added to the solution of the phosphite diester for each mol of the latter present therein. The resultant crude reaction mixture is neutralized or slightly esterified with a suitable acid, such as sulfuric, hydrochloric or phosphoric acid, or an organic acid such as acetic acid. Glacial acetic acid is commonly used for this purpose. Where the reaction mixture is unduly viscous it is diluted with an inert solvent for the reactants, preferably a volatile solvent such as benzene or toluene, or a dialkyl ether such as diethyl ether or dibutyl ether. The reaction mixture then is filtered and/or washed with water, and the filtrate or the washed mixture is fractionally distilled under subatmospheric pressure. The fraction containing the desired diesterified phosphono derivative of the carboxylic ester or of the corresponding amide or nitrile is separately recovered.

The condensation reaction may be conducted in the presence of a solvent for the reactants which is inert to the latter. The use of such a solvent is not essential; but it is desirable when the ester of the α,β-unsaturated monocarboxylic acid, or the amide or nitrile derivative thereof used as starting material, is a solid under the reaction conditions, or is a poor solvent for the phosphite diester or for the catalyst. Suitable solvents include the ethers such as diethyl ether, dibutyl ether, the diethers of the mono- and polyglycols, such as the dimethyl and diethyl ethers of ethylene and diethylene glycols, and dioxane; and aromatic hydrocarbons such as benzene and xylene.

The phosphite diesters useful in the process are those corresponding to the formula

$$(RO)_2 \overset{O}{\overset{\|}{P}} H$$

wherein R represents a radical of the class consisting of the aliphatic, alicyclic and aromatic hydrocarbon radicals, and the alkoxyalkyl, cycloalkoxyalkyl, and aryloxyalkyl radicals. Among the phosphite diesters useful in the process may be mentioned the methyl, ethyl, isopropyl, butyl, hexyl, n-octyl, 2-ethylhexyl, tetradecyl, octadecyl, phenyl, benzyl, cyclohexyl, methoxyethyl, ethoxyethyl, phenoxyethyl, tetrahydrofuranyl and tetrahydropyranyl phosphite diesters. Such phosphite diesters may be produced by various procedures known in the art, as by reacting the appropriate alcohol with phosphorus trichloride according to the equations:

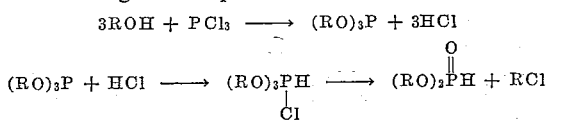

excess hydrogen chloride being removed from the reaction mixture as formed.

The α,β-unsaturated compounds employed in the process have the structure designated by the formula $$CR'R^2 = CR^3X$$

wherein R' represents hydrogen or an alkyl, alkenyl or aryl radical; and $R^2$ and $R^3$, respectively, represent a radical selected from the class consisting of hydrogen, and the alkyl radicals; X represents a radical selected from the class consisting of

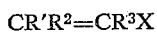

and CN; $R^4$ represents a radical selected from the class consisting of the alkyl, alkenyl, aralkyl, alkoxyalkyl, aryloxyalkyl, and cycloalkoxyalkyl radicals; and each $R^5$ represents the same or a different radical selected from the class consisting of hydrogen and the alkyl and aryl radicals.

Among the esters of α,β-unsaturated monocarboxylic acids useful in the process may be mentioned the methyl, ethyl, butyl, hexyl, 2-ethylhexyl, octyl, decyl, hexadecyl, methoxyethyl, ethoxyethyl, phenoxyethyl, benzyl, cyclohexyl and tetrahydrofuranyl esters of the following acids: acrylic acid, α-methacrylic acid, α-ethacrylic acid, β,β-dimethylacrylic acid, crotonic acid, tiglic acid, angelic acid, α-ethylcrotonic acid, sorbic acid, α-methyl sorbic acid and cinnamic acid. Suitable amides include the unsubstituted amides corresponding to the aforesaid esters, and the corresponding N-substituted amides wherein one or both of the amido hydrogen atoms is replaced by an alkyl group having from one to eighteen carbon atoms, or a phenyl group. Suitable nitriles include those corresponding to the aforesaid acids wherein the carboxylic group has been replaced with a CN group, such as acrylonitrile, α-methacrylonitrile and crotonic nitrile.

In accordance with the process the reaction of di(phenoxyethyl) phosphite and acrylonitrile yields 3-di-(phenoxyethyl)phosphonopropionitrile; dicyclohexyl phosphite and α,β-dimethyl acrylic acid phenoxyethyl ester yield phenoxyethyl 2-methyl-3-dicyclohexylphosphonobutyrate; dibenzyl phosphite and hexyl acrylate yield hexyl 3-dibenzylphosphonopropionate; di(tetrahydrofuranyl) phosphite and benzyl α-methacrylate yield benzyl 2-methyl-3-di-(tetrahydrofuranyl)phosphonopropionate; dicyclohexyl phosphite and butyl β,β-dimethylacrylate yield butyl 3-methyl-3-dicyclohexylphosphonobutyrate; di(β-ethoxyethyl) phosphite and methoxyethyl α-methacrylate yield methoxyethyl 2-methyl-3-di(ethoxyethyl)phosphonopropionate; dihexyl phosphite and crotonic acid nitrile yield 3-dihexylphosphonobutyronitrile; dibenzyl phosphite and crotonamide yield 3-dibenzylphosphonobutyramide; and diphenyl phosphite and crotonic anilide yield 3-diphenylphosphonobutyric anilide.

The overall condensation reaction is illustrated by the following equation involving the reaction of dibutyl phosphite and octyl acrylate which produces the octyl ester of 3(dibutylphosphono)propionic acid:

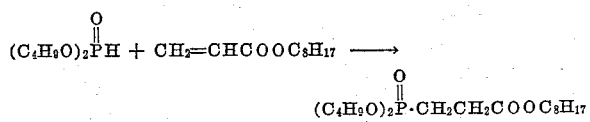

The following examples serve to illustrate the invention. In the examples all parts are given in terms of weight unless otherwise indicated.

Example 1

To an agitated solution of 194 parts of dibutyl phosphite containing 5 parts of sodamide were added 184 parts of 2-ethylhexyl acrylate. The reaction was completed after an hour while maintaining the mixture at 50° C.–67° C. The reaction mixture then was neutralized with glacial acetic acid, 176 parts of benzene were added, and the mixture was washed with 500 parts of water. Fractional distillation of the non-aqueous layer of the stratified mixture was conducted under vacuum. The desired 2-ethylhexyl ester of 3(dibutylphosphono)propionate was obtained in a 87% yield as an oily liquid boiling at 189° C. under a pressure of 1.5 mm. of mercury. It had a specific gravity at 20° C. of 0.985, and a refractive index at 20° C. of 1.4444.

Example 2

To an agitated solution of 776 parts of dibutyl phosphite and 15 parts of sodamide were added 212 parts of acrylonitrile in small successive portions. An exothermic reaction resulted, continuous cooling being employed to keep the temperature from rising above 80° C. The reaction was complete after one hour, and the mixture was neutralized with acetic acid, after which 350 parts of benzene were added, and the mixture was washed with 800 parts of water and permitted to stratify. The non-aqueous layer was filtered, and the filtrate was distilled under vacuum in a short packed column, resulting in a 74% yield of 3(dibutylphosphono)propionitrile in the form of a water white liquid boiling at 157° C. under a pressure of 1.8 mm. of mercury, and having a specific gravity at 20° C. of 1.026, and a refractive index at that temperature of 1.4418.

Example 3

388 parts of dibutyl phosphite and 10 parts of sodamide were charged into a flask and 284 parts of butyl crotonate were added dropwise during thirty minutes to the agitated solution while keeping the reaction mixture at about 65° C. The reaction was complete in 1.5 hours, after which the reaction mixture was neutralized with acetic acid, 220 parts of benzene were added, and the mixture was washed with 500 parts of water. Upon stratification, the non-aqueous layer was fractionally distilled under vacuum in a Claisen type still, resulting in an 81% yield of butyl 3(dibutylphosphono)butyrate in the form of a water white liquid boiling at 185° C. under a pressure of 1.8 mm. of mercury. It had a specific gravity at 20° C. of 0.986, and a refractive index at 20° C. of 1.4427.

Example 4

A mixture of one mol of dibutyl phosphite and one mol of butyl crotonate in a glass vessel was heated for one month at 100° C. The resultant mixture was pot distilled under reduced pressure, yielding, in addition to recovered starting materials, a small fraction having a boiling point and refractive index indicating that it was butyl 3-dibutylphosphonobutyrate slightly contaminated with the starting materials.

Example 5

Following the general procedure described in Example 3, 284 parts of butyl methacrylate were added dropwise to an agitated solution of 388 parts of dibutyl phosphite containing 25 parts of sodamide. The reaction was complete after 1.5 hours, the temperature during this time being maintained at 60° C.–70° C. The reaction mixture was neutralized with glacial acetic acid, 220 parts of benzene were added, and this mixture was washed with 500 parts of water. The water-washed liquid was fractionally distilled under a vacuum in a Claisen type still, thus providing a 65% yield of butyl 2-methyl-3-(dibutylphosphono)propionate as a water white liquid boiling at 162° C. under a pressure of 1.7 mm. of mercury. It had a specific gravity at 20° C. of 0.999, and a refractive index at 20° C. of 1.4397.

Example 6

One mol (100 grams) of ethyl acrylate was slowly added over 0.5 hour to one mol (246 grams) of dicyclohexyl phosphite containing 60 cc. of a commercial solution of benzyl trimethylammonia butoxide heated to 70° C. The crude reaction mixture was slightly acidified with acetic acid, diluted with 175 grams of dibutyl ether and washed with water. The washed product was distilled under vacuum to a kettle temperature of 213° C. under 4.5 mm. of mercury pressure, and the residue was distilled in a falling film-type still under high vacuum, providing a 73% yield of ethyl 3-di(cyclohexylphosphono)-propionate as an oily liquid boiling at 149° C. under a pressure of 0.5 mm. of mercury, and having a refractive index at 30° C. of 1.4700, and a specific gravity at 20° C. of 1.088.

Example 7

One mol of butyl cinnamate was added dropwise to a mixture of one mol of dibutyl phosphite and 9 grams of sodamide while maintaining the reaction mixture at a temperature of 50° C.–70° C. The reaction mixture was neutralized with acetic acid, diluted with 350 cc. of benzene, washed with water, and fractionally distilled under vacuum in a pot type still, thereby providing an 86% yield of butyl 3-phenyl-3(dibutylphosphono)propionate in the form of a light amber oily liquid boiling at 198° C. under a pressure of 1.3 mm. of mercury, and having a specific gravity at 20° C. of 1.0407, and a refractive index at 20° C. of 1.4779. This compound was compatible with a commercial vinyl chloride-acetate copolymer resin in an amount 33% of the resin composition.

Example 8

Following the general procedure described in Example 7, one mol of dibutyl phosphite was reacted with one mol of butyl sorbate in the presence of 23 grams of sodamide as catalyst, while maintaining the reaction temperature between 50° C. and 65° C. The reaction mixture was neutralized with acetic acid, diluted with 350 cc. of benzene, and washed with water. The washed product was fractionally distilled under vacuum in a pot type still, yielding butyl 3(dibutylphosphono)hexen-4-oate in the form of a liquid boiling at 200° C. under a pressure of 1.4 mm. of mercury, and having a specific gravity at 20° C. of 0.997.

Example 9

2-ethylhexyl acrylate (0.5 mol) was added dropwise to a mixture of dicyclohexyl phosphite (0.5 mol) containing 5 grams of sodamide catalyst. After completion of the slightly exothermic reaction, the catalyst was neutralized with acetic acid, 110 cc. of dibutyl ether were added, and the resultant mixture was washed three times with water. The washed material was stripped under vacuum in a pot still to a kettle temperature of 200° C. under a pressure of 2 mm. of mercury, and the residual product was distilled under high vacuum on a falling film type molecular still, yielding 2-ethylhexyl 3(dicyclohexylphosphono)propionate in the form of a viscous, water white, oily liquid boiling at 145° C. under a pressure of 6 microns of mercury, and having a specific gravity at 20° C. of 1.040 and a refractive index at 30° C. of 1.4723. The product was compatible with a commercial grade of vinyl chloride-acetate copolymer resin at a concentration of 40% to yield a clear sheet of the resin.

Example 10

Three grams of metallic sodium were dissolved in one mol of dibutyl phosphite to form the sodium salt of dibutyl phosphite. To this solution one mol (67 grams) of α-methacrylonitrile was added during 35 minutes. When the slightly exothermic reaction was completed the mixture was acidified with acetic acid, diluted with dibutyl ether, washed with water, and fractionally distilled under vacuum in a pot type still. After removing the solvent and excess starting materials, 2-methyl-3-dibutylphosphonopropionitrile was recovered in 87% yield as a straw-colored liquid boiling at 157° C.–164° C. under a pressure of 3.4 mm. of mercury, and having a refractive index at 30° C. of 1.4388, and a specific gravity at 20° C. of 1.011.

Example 11

A mixture of one mol of acrylamide and one mol of dibutyl phosphite was slowly added over an 0.5 hour period to a solution of 13 grams of sodamide and 44 grams of dibutyl phosphite in 150 cc. of benzene. After an exothermic reaction, at temperatures no higher than 80° C., the mixture was neutralized with acetic acid, washed with water, and stripped in a pot still to a kettle temperature of 170° C. under a pressure of 3.5 mm. of mercury. The stripped material then was distilled under vacuum in a falling film type still, yielding 3(dibutylphosphono)propionamide as a white mushy solid which distilled (falling film) at 150° C. under a pressure of 0.5 mm. of mercury. The solid melted at 37° C., and had a nitrogen content of 5.4% (theoretical nitrogen content 5.28%).

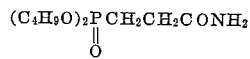

Example 12

One mol of N-methacrylamide was added dropwise to a mixture of one mol of dibutyl phosphite and 5 grams of sodamide while maintaining the temperature at 70° C.–76° C. After the slightly exothermic reaction was completed, the reaction mixture was slightly acidified with acetic acid, 350 cc. of benzene were added, and the mixture was washed with 750 cc. of water. The washed material was fractionally distilled under vacuum in a short packed column, thereby providing a 60% yield of N-methyl 3(dibutylphosphono)propionamide in the form of a water white liquid boiling at 180° C. under a pressure of 3.2 mm. of mercury. The compound had a specific gravity at 20° C. of 1.083, and a refractive index at 30° C. of 1.4580.

Example 13

Over a period of 20 minutes 0.55 mol (78 grams) of butyl crotonate was added to a mixture of 0.5 mol (99 grams) of di(methoxyethyl) phosphite and 5 grams of sodamide slurry. When the slightly exothermic reaction was complete the reaction mixture was slightly acidified with acetic acid, filtered, and distilled under vacuum to a kettle temperature of 170° C. under 3 mm. of mercury pressure. The residue was distilled under high vacuum, providing a 67% yield of butyl 3-di(methoxyethylphosphono)butyrate in the form of an oily liquid boiling at 120° C. under a pressure of 0.5 mm. of mercury, and having a refractive index at 30° C. of 1.4421 and a specific gravity at 20° C. of 1.081.

Example 14

To a solution of the calcium salt of dibutyl phosphite, made by refluxing for 13 hours a solution of 194 parts of dibutyl phosphite in benzene and 15 parts of metallic calcium, were added 53 parts of acrylonitrile and the mixture was heated for 2.5 hours at 90° C.–100° C. The product was acidified with acetic acid, filtered, diluted with dibutyl ether, and washed with water. Pot distillation under vacuum provided a fair yield of 3(dibutylphosphono)propionitrile.

The term "amide" as used in the claims is intended to cover both the unsubstituted and the N-substituted amides hereinbefore defined.

The invention is susceptible of modification within the scope of the appended claims.

I claim:

1. As new products, compounds having a structure designated by the formula

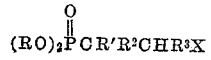

wherein R represents a radical selected from the class consisting of the alkyl radicals having at least 4 carbon atoms, and the alkenyl, aryl, aralkyl, cyclohexyl, alkoxyethyl, phenoxyethyl, tetrahydrofuranyl, and tetrahydropyranyl radicals; R' designates a radical selected from the class consisting of hydrogen and the alkyl, alkenyl and aryl groups; $R^2$ and $R^3$, respectively, represent radicals selected from the group consisting of hydrogen and the alkyl radicals; X represents a radical selected from the class consisting of —COOR⁴, CONR₂⁵ 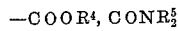

and CN, wherein $R^4$ designates a radical selected from the class consisting of the alkyl, alkenyl, aralkyl, cyclohexyl, alkoxyethyl, aryloxyethyl, and tetrahydrofuranyl radicals, and wherein each $R^5$ designates a radical selected from the class consisting of hydrogen and the alkyl and aryl radicals.

2. As new compounds, water-insoluble diesterified phosphono derivatives of saturated esters, amides and nitrile derivatives of fatty acids having at least three carbon atoms in the molecule, said compounds having at least one hydrogen atom connected with the carbon atom in the 2-position, and having a hydrogen atom associated with the carbon atom in the 3-position substituted by the residue of a phosphite alkyl diester containing a total of at least eight carbon atoms.

3. As new compounds, water-insoluble diesterified phosphono derivatives of saturated esters of saturated monocarboxylic acids, said acids containing at least three carbon atoms in the molecule, said compounds having at least one hydrogen atom connected with the carbon atom in the 2-position, and having connected with the carbon atom in the 3-position a diesterified phosphono group including two saturated aliphatic hydrocarbon radicals, each of such radicals having at least four carbon atoms.

4. As a new compound, the 2-ethylhexyl ester of 3-(dibutylphosphono)propionic acid.

5. As a new compound, the 2-ethylhexyl ester of 3-(dicyclohexylphosphono)propionic acid.

6. As a new compound, the butyl ester of 3-phenyl-3-(dibutylphosphono)propionic acid.

7. Process for producing beta-(diesterified phosphono)-substituted compounds of the class consisting of the aliphatic and aromatic monocarboxylic esters, acid amides and nitriles, which comprises reacting a phosphite diester with an alpha, beta-olefinically unsaturated compound selected from the class consisting of the alpha, beta-olefinically unsaturated monocarboxylic esters, acid amides and nitriles, in the presence of an alkaline catalyst, said phosphite diester having the structure (RO)₂P(O)H, wherein R is a radical of the class consisting of the alkyl, alkenyl, aryl, aralkyl, cyclohexyl, alkoxyethyl, phenoxyethyl, tetrahydrofuranyl and tetrahydropyranyl radicals, thereby producing a beta-(diesterified phosphono)substituted compound of the class consisting of the monocarboxylic esters, acid amides and nitriles free from olefinic unsaturation.

8. Process for producing diesterified phosphono derivatives of compounds selected from the class consisting of aliphatic and aromatic monocarboxylic esters, amides and nitriles, which comprises reacting a phosphite diester having a hydrogen atom connected with the phosphorus atom with an α,β-olefinically unsaturated organic compound selected from the class consisting of the α,β-olefinically unsaturated monocarboxylic esters, amides and nitriles, while maintaining the reaction mixture at a temperature no higher than 200° C., said diester being of the type

wherein each R is a radical selected from the class consisting of the alkyl, alkenyl, aryl, aralkyl, cyclohexyl, alkoxyethyl, phenoxyethyl, tetrahydrofuranyl and tetrahydropyranyl radicals.

9. Process for producing diesterified phosphono derivatives of compounds selected from the class consisting of aliphatic and aromatic monocarboxylic esters, amides and nitriles, which comprises reacting a phosphite diester having a hydrogen atom connected with the phosphorus atom with an α,β-olefinically unsaturated organic compound selected from the class consisting of the α,β-olefinically unsaturated monocarboxylic esters, amides and nitriles, in the presence of an alkaline condensation catalyst, while maintaining the reaction mixture at a temperature no higher than 200° C., said diester being of the type

wherein each R is a radical selected from the class consisting of the alkyl, alkenyl, aryl, aralkyl, cyclohexyl, alkoxyethyl, phenoxyethyl, tetrahydrofuranyl and tetrahydropyranyl radicals.

10. Process for producing diesterified phosphono derivatives of compounds selected from the class consisting of aliphatic and aromatic monocarboxylic esters, amides and nitriles, which comprises reacting a phosphite diester having a hydrogen atom connected with the phosphorus atom with an α,β-olefinically unsaturated organic compound selected from the class consisting of the α,β-olefinically unsaturated monocarboxylic esters, amides and nitriles, in the presence of an alkali metal salt of a phosphite diester, while maintaining the reaction mixture at a temperature no higher than 200° C., said diester being of the type

wherein each R is a radical selected from the class consisting of the alkyl, alkenyl, aryl, aralkyl, cyclohexyl, alkoxyethyl, phenoxyethyl, tetrahydrofuranyl and tetrahydropyranyl radicals.

11. Process for producing diesterified phosphono derivatives of compounds selected from the class consisting of aliphatic and aromatic monocarboxylic esters, amides and nitriles, which comprises reacting a phosphite diester having a hydrogen atom connected with the phosphorus atom with an α,β-olefinically unsaturated compound selected from the class consisting of the α,β-unsaturated monocarboxylic esters, amides and nitriles at a temperature within the range from 25° C. to 125° C., in the presence of an alkaline condensation catalyst and of an inert solvent for the reactants, said diester being of the type

wherein each R is a radical selected from the class consisting of the alkyl, alkenyl, aryl, aralkyl, cyclohexyl, alkoxyethyl, phenoxyethyl, tetrahydrofuranyl and tetrahydropyranyl radicals.

12. Process for the production of an ester of a saturated monocarboxylic acid substituted in the 3-position with the residue of a phosphite diester, which comprises reacting a phosphite diester having a hydrogen atom connected with the phosphorus atom with an ester of an α,β-olefinically unsaturated monocarboxylic acid, in the presence of an alkaline condensation catalyst, and at a temperature within the range between 25° C. and 125° C., and recovering from the resultant reaction mixture the ester of the di(esterifiedphosphono) substituted monocarboxylic acid thus produced, said diester being of the type

wherein each R is a radical selected from the class consisting of the alkyl, alkenyl, aryl, aralkyl, cyclohexyl, alkoxyethyl, phenoxyethyl, tetrahydrofuranyl and tetrahydropyranyl radicals.

13. Process for producing a monocarboxylic acid amide substituted in the 3-position with a diesterified phosphono group, which comprises reacting a phosphite diester having a hydrogen atom connected with the phosphorus atom with an amide of an α,β-olefinically unsaturated monocarboxylic acid in the presence of an alkaline condensation catalyst, while maintaining the reaction temperature within the range between 25° C. and 125° C., and recovering from the resultant reaction mixture the phosphite diester-substituted amide thus produced, said diester being of the type

(RO)₂PH wherein each R is a radical selected from the class consisting of the alkyl, alkenyl, aryl, aralkyl, cyclohexyl, alkoxyethyl, phenoxyethyl, tetrahydrofuranyl and tetrahydropyranyl radicals.

14. Process for producing organic nitriles having at least three carbon atoms and having a hydrogen associated with the carbon atom in the 3-position replaced by a diesterified phosphono group, which comprises reacting a phosphite diester having a hydrogen atom connected with the phosphorus atom with an α,β-olefinically unsaturated nitrile having at least three carbon atoms in the molecule, in the presence of an alkaline condensation catalyst, while maintaining the reaction temperature within the range between 25° C. and 125° C. and recovering from the resultant reaction mixture the saturated nitrile substituted in the carbon atom in the 3-position with a diesterified phosphono group thus produced, said diester being of the type

(RO)₂PH wherein each R is a radical selected from the class consisting of the alkyl, alkenyl, aryl, aralkyl, cyclohexyl, alkoxyethyl, phenoxyethyl, tetrahydrofuranyl and tetrahydropyranyl radicals.

15. Process which comprises reacting a dialkyl phosphite with an aliphatic monoester of an ethylene alpha, beta-monocarboxylic acid, in the presence of an alkaline catalyst, thereby producing an aliphatic monoester of a beta-(dialkylphosphono)substituted aliphatic saturated monocarboxylic acid.

16. Process which comprises reacting a dialkyl phosphite and an olefinic ester having the formula

$CH_2=CHCOOR^4$ wherein $R^4$ is selected from the group consisting of the alkyl, alkenyl, aralkyl, cyclohexyl, alkoxyethyl, aryloxyethyl and tetrahydrofuranyl radicals, in the presence of an alkaline catalyst, and recovering from the resultant reaction mixture an adduct having the structure

$(RO)_2P(O)—CH_2CH_2COOR^4$ wherein R is an alkyl radical.

17. The process of effecting an addition reaction of a dialkyl phosphite with an aliphatic monoester of an ethylene alpha, beta monocarboxylic acid in the presence of an alkali metal as a catalyst to obtain an aliphatic monoester of a beta-(dialkyl phosphono) aliphatic saturated monocarboxylic acid.

18. Process which comprises reacting a dialkyl phosphite and acrylonitrile, in the presence of an alkaline catalyst, thereby producing a beta-(dialkyl phosphono)-propionitrile.

19. Process which comprises reacting a dialkyl phosphite and an alpha, beta-olefinically unsaturated monocarboxylic acid amide, in the presence of an alkaline catalyst, thereby producing a beta-(dialkylphosphono)-substituted amide of a saturated monocarboxylic acid.

References Cited in the file of this patent

UNITED STATES PATENTS

| | | |
|---|---|---|
| 2,389,576 | Kosolapoff | Nov. 20, 1945 |
| 2,439,214 | Lindsey | Apr. 6, 1948 |
| 2,440,800 | Hanford et al. | May 4, 1948 |
| 2,478,390 | Hanford et al. | Aug. 9, 1949 |
| 2,492,994 | Harman et al. | Jan. 3, 1950 |

OTHER REFERENCES

Nylen: Berichte, vol. 59, pp. 1119–1128.